United States Patent [19]

Takamori

[11] Patent Number: 4,769,806
[45] Date of Patent: Sep. 6, 1988

[54] DISC INFORMATION REPRODUCING APPARATUS

[75] Inventor: Hiromitu Takamori, Fujisawa, Japan

[73] Assignee: Kabushiki Kaisha Toshiba, Kanagawa, Japan

[21] Appl. No.: 11,257

[22] Filed: Feb. 5, 1987

[30] Foreign Application Priority Data

Feb. 13, 1986 [JP] Japan .................................. 61-29306

[51] Int. Cl.$^4$ ........................ G11B 25/04; G11B 1/00; G11B 7/00
[52] U.S. Cl. ..................................... 369/292; 369/43; 369/45; 360/137
[58] Field of Search .................... 369/53, 43, 45, 291, 369/292, 154; 360/137

[56] References Cited

FOREIGN PATENT DOCUMENTS 205875 12/1982 Japan .................................. 360/137

Primary Examiner—Steven L. Stephan
Attorney, Agent, or Firm—Finnegan, Henderson, Farabow, Garrett & Dunner

[57] ABSTRACT

A disc information reproducing apparatus for reproducing information stored on an optical recording medium, the apparatus being subjected to expose to environments of varying temperature which produce condensation moisture in the apparatus. The apparatus includes an optical system for projecting the beam onto the optical recording medium for reflecting and modulating the beam in accordance with the information stored on the optical recording medium, an operating current generating circuit for generating a variable operating current in response to the reflected beam for controlling the optical system, a booster current source for selectively supplying a boasted current larger than the operating current to the optical system for generating heat in the optical system for removing condensation moisture from the apparatus.

10 Claims, 2 Drawing Sheets

DISC INFORMATION REPRODUCING APPARATUS

BACKGROUND OF THE INVENTION

1. Field of the Invention

The present invention relates generally to an apparatus for reproducing information stored on optical record discs, such as digital audio discs or video discs, and more particularly, to a disc information reproducing apparatus which includes a condensation moisture removal capability.

2. Description of the Prior Art

As is well known, in the fields of audio or video apparatus, high density optical record systems such as digital audio disc systems or video disc systems have been developed. In these systems, audio or video information signals are optical-readably stored and disc record medium in the form of analog data or digitized data by a PCM (pulse-code modulation) technique. Optical audio or video disc players are provided for reproducing the information signals stored on the optical record discs. The optical record discs of this type, for example, compact discs (a type of digital audio disc), optical video or image discs and the like are so arranged that digital data intended for high density storing are stored in the form of a pit string. The pit string forms a spiral track or plurality of concentric tracks on one side of the disc. For reproduction, the pit string is read by means of an optical pickup device. In the compact disc, the information normally is stored on a spiral track from an inner region of the disc towards an outer region of the disc.

The optical pickup device is provided with a light source, such as a semiconductor laser, an optical system comprising, for example, a lens, such as an objective lens, a photodetector and actuators. The semiconductor laser generates a laser beam. The optical record disc is projected the laser beam by the optical system and the optical system introduces the laser beam reflected by the optical record disc to the photodetector. The focus actuator controls positioning of the beam on the optical record disc. The objective lens focuses the laser beam on the surface of the optical record disc. The tracking actuator controls the optical system so that the objective lens makes the laser beam follow the track of the pit string.

The optical information reproducing apparatus, for example, a player for reproducing the compact disc as described above, utilizes an optical pickup device to read data stored on the compact disc. The optical pickup device reads out the data from the compact disc as it moves radially from the inner region of the disc to the outer region of the disc as the compact disc rotates at a constant linear velocity (CLV) in relation to the optical pickup device.

The optical pickup devices must have very high performance for the optical systems and the actuators to read out the high density stored data accurately. However, when the temperature of the environment surrounding the compact disc player suddenly changes from a low temperature to a high temperature, condensation moisture occures and various parts of the player mechanism may be covered by condensation moisture. That is, condensation moisture presents on the construction parts of the compact disc player due to a temperature difference between the parts, which are at a relatively low temperature and the new surrounding environment which is at a latively high temperature. For example, condensation moisture presents on the parts of the compact disc player when the player is brought into a warm room from a cold outdoor area.

In this moisture condensating condition, a problem may occure with the player, especially with the optical system and the actuators. For example, condensation moisture presents on an optical element of the optical system, such as the objective lens, severly disturbs the laser beams to be projected on the disc through the optical system. As a result, the optical pickup device may fail to read out the data from the compact disc. When condensation moisture occures in a gap of a bearing portion that movably supports the actuator in the optical pickup device, the condensation moisture may obstruct the lubrication of the bearing portion due to the surface tension of water (condensation moisture). Moreover, condensation moisture can cause rust in the bearing portion and can damage the lubrication of the bearing.

This problem of condensation moisture has been particularly evident in portable type disc players, because the portable players are often carried to places of different temperatures. For example, such players often are carried between indoors and outdoors. The problem of condensation moisture also has been evident in so-called CD-ROM readers (a CD-ROM is a type of compact disc used as a read only memory device for electronic computers and other various control devices). This is because higher accuracy is required in the reading of the CD-ROMs.

In conventional optical disc information reproducing apparatus, the apparatus has been left as it be until the apparatus has become able to operate. That is, there has been no attempt for positively removing condensation moisture in the apparatus. Then, the inventor of this invention has attempted to use a heater in the optical piockup device for removing condensation moisture from the optical system, especially, the objective lens or the bearing portion of the actuators by its heating energy. However, the use of the heater has made the structure of the optical pickup device much more complicated. The use of the heater also has made the optical pickup device larger and heavier. In addition, additional electric wirings have been necessary between the device and other parts of the compact disc player when a heater has been used so that the structure of the compact disc player has become more and more complicated.

SUMMARY OF THE INVENTION

Accordingly, an object of the present invention is to rapidly remove condensation moisture from an optical pickup device of a disc information reproducing apparatus without the use for an additional element, such as a heater.

Another object of the present invention is to rapidly remove condensation moisture from an optical element, such as an objective lens, in an optical pickup device of a disc information reproducing apparatus without the need for an additional element, such as a heater.

In order to achieve the above objects, the disc information reproducing apparatus for reproducing information stored on an optical recording medium, the apparatus being subjected to expose to environments of varying temperature which produce condensation moisture in the apparatus, which includes an optical system for projecting the beam onto the optical recording medium for reflecting and modulating the beam in accordance with the information stored on the optical recording medium, an operating current generating circuit for generating a variable operating current in response to the reflected beam for controlling the optical system, a booster current source for selectively supplying a boosted current larger than the operating current to the optical system for generating heat in the optical system for removing condensation moisture from the apparatus.

DESCRIPTION OF THE PREFERRED EMBODIMENTS

Figure 1:
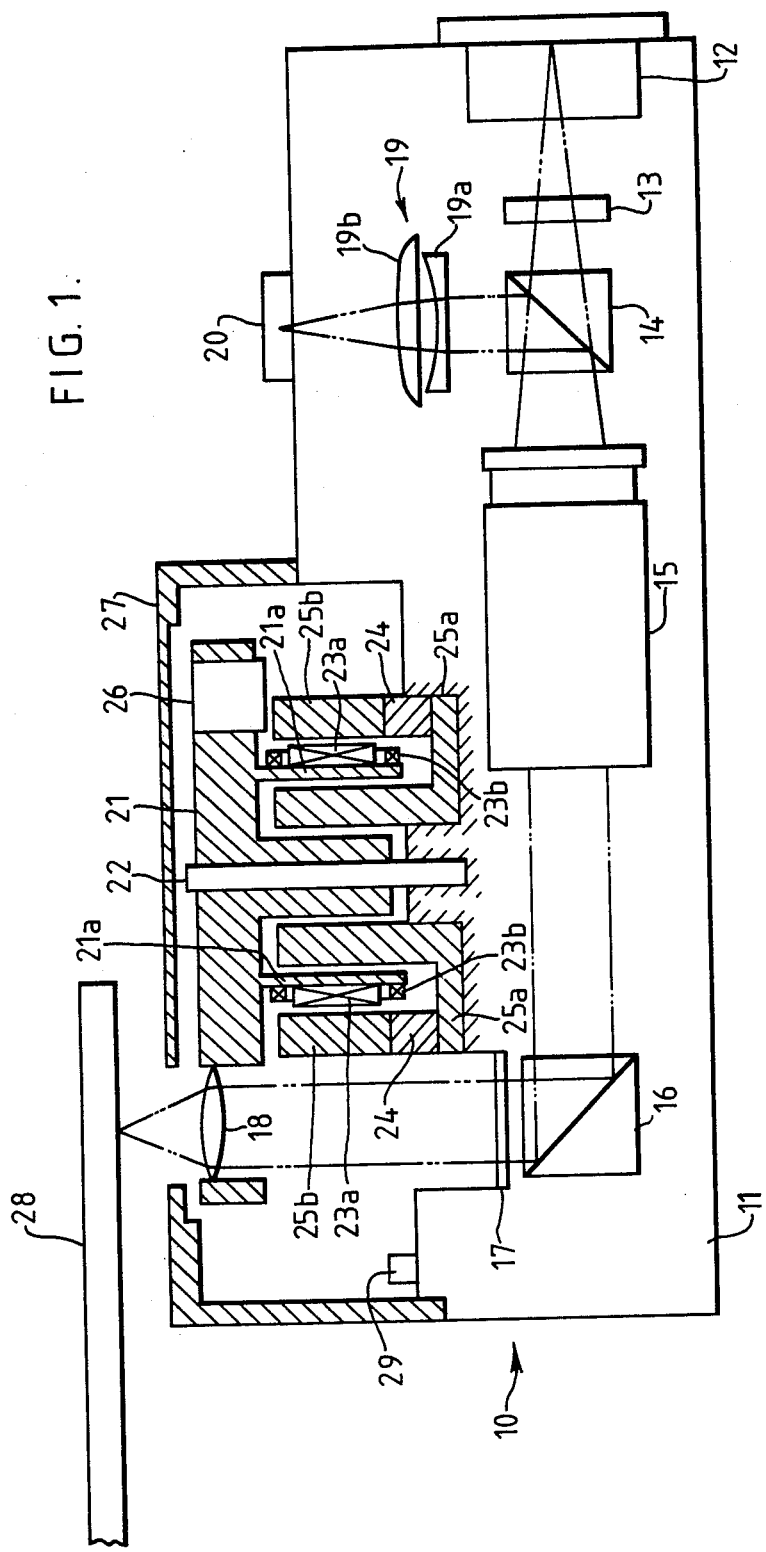
FIG. 1 is a sectional side view showing an example of a typcial optical pickup device.

The present invention will now be described in detail with reference to the accompanying drawings, namely, FIGS. 1 and 2. Throughout the drawings, like reference numerals and letters are used to designate like or equivalent elements for the sake of simplicity of explanation.

Referring now to FIG. 1, an example is shown of a typical optical pickup device to which the present invention is applied. FIG. 1 shows a sectional view of an optical pickup device 10. The optical pickup device 10 has a pickup housing 11 formed in a substantially box like shape from a metal, such as aluminum. Inside the pickup housing 11, there are provided various optical elements, i.e., a semiconductor laser 12, a diffraction grating 13, a polarization beam splitter 14, a collimator lens 15, a prism mirror 16, a quarter (¼) wavelength plate 17, an objective lens 18, an astigmatic lens unit 19 comprising a concave lens 19a and a convex lens 19b, and a photodetector 20.

A laser beam, which is a divergent beam having a spherical waveform emitted from the semiconductor laser 12, is introduced into the diffraction grating 13. The diffraction grating 13 divides the divergent beam into three beams, namely, a primary beam with a 0-order diffraction and first and second secondary beams with ± first order diffractions. The diffraction grating 13 also produces other beams with ± second and higher order diffractions. However, the higher order beams are negligible, because they have very low energies in comparison to the primary beam and the first and second secondary beams.

These three divergent laser beams are introduced into the collimator lens 15 together. The collimator lens 15 converts each of the laser beams to a parallel laser beam having a planar waveform. The three parallel laser beams are introduced into the quarter wavelength plate 17 after being reflected by the prism mirror 16. The quarter wavelength plate 17 shifts the polarization of the laser beams by 45. As a result, the beams are converted into circularly polarized laser beams. The three circularly polarized laser beams are introduced into the objective lens 18. The objective lens 18 converges the parallel laser beams and applies them to an information record surface of an optical disc 28. The laser beams are controlled so as to be focused on the information record surface of the optical disc 28 by a focus actuator 23a. The laser beams are controlled so as to follow a track of pit strings on the disc by a tracking actuator 23b. In an well controlled condition, the primary beam is applied to the center of the track and the first and second secondary beams are applied to respective ends of the track. The primary beam is modulated by the pit string while the first and second secondary beams are modulated by divergent conditions from the respective ends of the track.

The three laser beams are reflected by the optical disc 28 and the reflected beams are transmitted back to the polarization beam splitter 14 through the objective lens 18, the quarter wavelength plate 17, the prism mirror 16, and the collimator lens 15. The quarter wavelength plate 17 is therefore traversed twice by the laser beams and shifts the polarizations of the reverse or reflected direction laser beams by 90°, i.e., a quarter wavelength of each of the beams.

The forward direction laser beam emitted by the semiconductor laser 12 is almost entirely transmitted through the polarization beam splitter 14, while the reverse direction laser beams modulated by the optical disc 28 are almost entirely reflected by the polarization beam splitter 14 due to the 90° shifted polarization. The reverse direction laser beams, therefore, are directed toward the astigmatic lens unit 19. The astigmatic lens unit 19 introduces the laser beam to the photodetector 20, which is disposed in the path of the modulated beam. The photodetector 20 generates electrical signals, i.e., a reproduction signal, a focus signal and a tracking signal. The reproduction signal is obtained by detecting the modulation or the strength of the primary beam. The focus signal is obtained by comparing the first and second secondary beams. The tracking signal is obtained by detecting an astigmatic state of the primary beam. The reproduction signal is provided for reproduction of information data, i.e., audio or video signals. The focus signal and the tracking signal are provided to the actuators for focus servo control and tracking servo control of the primary beam.

The objective lens 18 is fixed to a lens bracket 21 made of aluminum and having T-shaped section. The lens bracket 21 is supported, so that it is slidable and rotatable in relation to a shaft 22. The shaft 22 is provided on the pickup housing 11 in perpendicular relation to the surface of the optical disc 28.

The focus actuator or coil 23a and the tracking actuator or coil 23b are fixed on a bobbin member 21a of the lens bracket 21 and are located in a magnetic gap of a magnetic circuit. The magnetic circuit is formed by a magnet 24, an inner yoke 25a and an outer yoke 25b. One end of each of the inner yoke 25a and the outer yoke 25b is fixed to opposite pole end of the magnet 24. The other ends of each of the yokes 25a and 25b face each other to form the magnetic gap. The focus coil 23a is wound in a plane perpendicular to the shaft 22 so that it drives the lens bracket 21 in the direction of the shaft 22 when the focus coil 23a is activated. Accordingly, the objective lens 18 can be moved in the focus direction by the focus coil 23a. The tracking coil 23b is wound in a plane parallel to the shaft 22 so that it rotates the lens bracket 21 around the shaft 22 when the tracking coil 23b is activated. Accordingly, the objective lens 18 can be moved in the tracking direction by the tracking coil 23b.

The lens bracket 21 also includes a balance weight 26 to balance with the objective lens 18. Also, a cover 27 made of plastic material is attached to the pickup housing 11 so as to cover the lens bracket 21, but leaving a window at a position opposite the objective lens 18. The optical pickup 10 also includes a condensation moisture sensor 29 mounted within the area enclosed by the cover 27.

Figure 2:
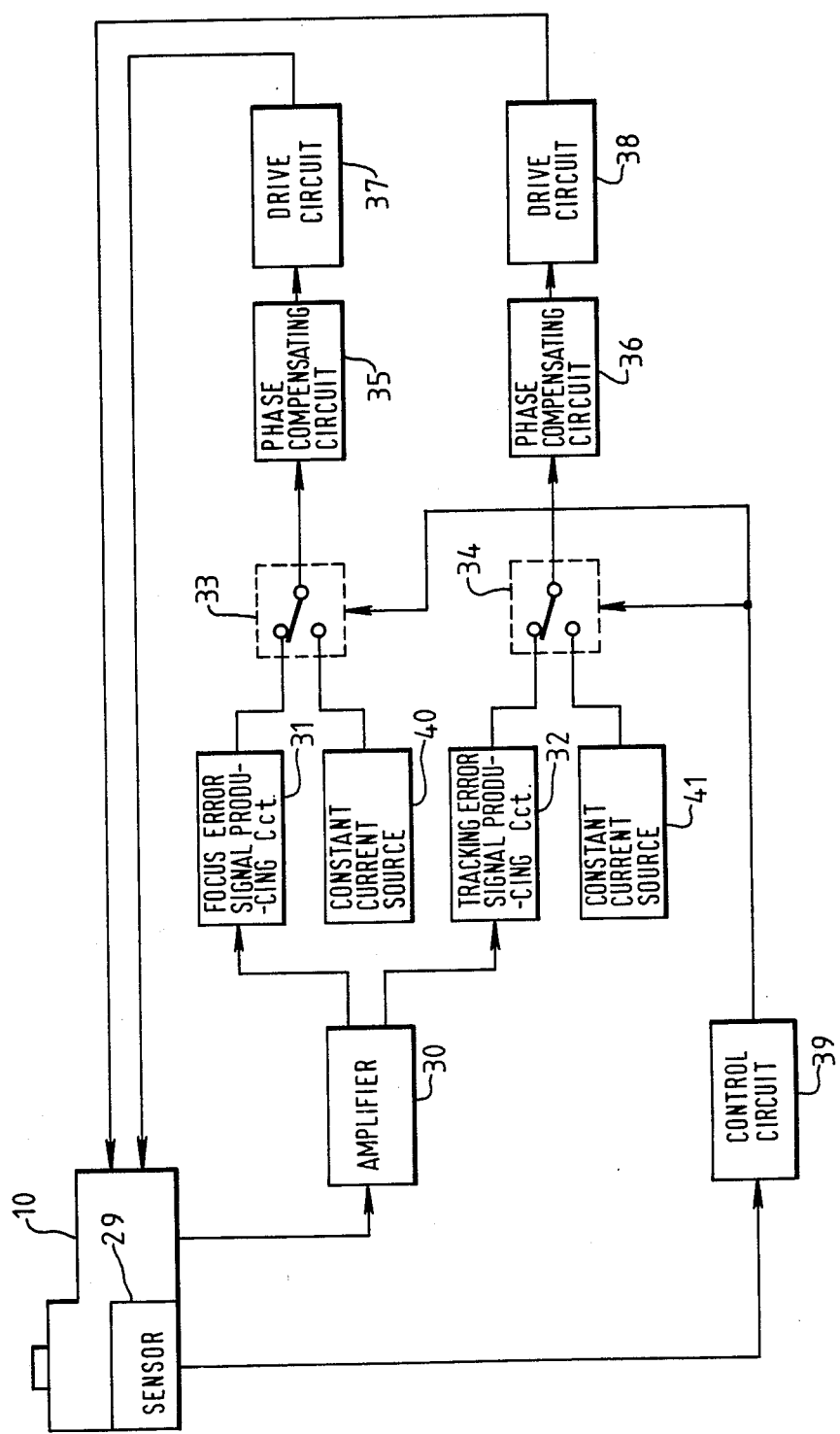
FIG. 2 is a block diagram showing an embodiment of a condensation moisture removing device for a disc information reproducing apparatus according to the present invention.

Referring now to FIG. 2, an embodiment of a condensation moisture removing device for a disc information reproducing apparatus according to the present invention will be described. A condensation moisture sensor 29, for example, a humidity sensitive type sensor, is provided in the optical pickup 10 for detecting the moisture condensating condition of the optical elements or the bearing portion between the lens bracket 21 and the shaft 22.

In a typical reproduction operation, the focus signal and the tracking signal obtained from the photodetector 20 of the optical pickup 10 are supplied to a focus error signal producing circuit 31 and a tracking error signal producing circuit 32, respectively, through amplifying circuit 30. An operating currents, such as a focus error signal and a tracking error signal outputted from these focus error signal producing circuit 31 and tracking error signal producing circuit 32 are applied to the focus coil 23a and the tracking coil 23b, respectively, (see FIG. 1) through switches 33 and 34, phase compensating circuits 35 and 36, and drive circuits 37 and 38. This provides the focus servo control and the tracking servo control for the objective lens 18.

When some elements, e.g., the objective lens 18 or the bearing gap between the lens bracket 21 and the shaft 22 become moist from condensation, the condensation moisture sensor 29 detects the moisture condensating condition and generates a condensation moisture detection signal. The condensation moisture detection signal is applied to control terminals of the switches 33 and 34 through a control circuit 39. Then the switches 33 and 34 are switched so that constant current sources 40 and 41 are connected to the focus coil 23a and the tracking coil 23b, respectively, through the phase compensating circuits 35 and 36, and the drive circuits 37 and 38. The constant current sources 40 and 41 apply constant currents respectively to the drive circuits 37 and 38 through the phase compensation circuits 35 and 36. The constant current of the constant current source 40 is set so that the drive circuit 37 outputs a first boosted current larger than the focus error signal. The first boosted current may be set nearly to a maximum rated current of the focus coil 23a. Also, the constant current of the constant current source 41 is set so that the drive circuit 38 outputs a second boosted current larger than the tracking error signal. The second boosted current may be set nearly to a maximum rated current of the tracking coil 23b.

These boosted currents are applied to the focus coil 23a and the tracking coil 23b, respectively. Then the focus coil 23a and the tracking coil 23b generate heat according to the boosted applied from the drive circuits 37 and 38. The coils 23a and 23b heat the lens bracket 21 and the optical elements, such as the objective lens 18, either directly or indirectly. In response to the boosted currents larger than the focus error signal and the tracking error signal, the lens bracket 21 is biased toward one end in the focus direction, i.e., in the direction along the shaft 22 and one end in the tracking direction, i.e., in the direction around the shaft 22. Therefore, the optical pickup 10 is unable to reproduce data stored on the optical disc 28 when the boasted currents are applied. However this is not significant problem, since the reproducing operation already is impaired or prevented when condensation moisture is present.

As described above, according to the embodiment of a disc information reproducing apparatus, the heat generated by the boosted current of the focus coil 23a or the tracking coil 23b is able to rapidly remove the condensation moisture without the need for any additional device, such as a heater.

In the embodiment, the currents are applied to both the focus coil 23a and the tracking coil 23b for removing condensation moisture. However, the boosted current may be applied to either of these coils. Alternatively, current may be applied to another coil, such as a position control coil of the optical element for removing condensation moisture.

Futher, the switches 33 and 34 automatically may be changed over by the output of the condensation moisture sensor 29, or these switches 33 and 34 may be changed over manually by a user.

Tests on the speed of condensation moisture removal for compact disc players utilizing the invention are described below. In the tests, two test samples of a compact disc player were first left in a low-temperature room of $-5°$ C. for two hours, and then were moved into a room at a normal temperature of $25°$ C. Thus, the two samples were exposed to the same temperature and environmentan conditions, and both samples become covered with condensation moisture on all over their parts. First sample was left as it is, i.e., without being exposed to any positive heating. The second sample was supplied with the maximum rated currents to its focus coil and tracking coil. In the test, the focus coil was supplied with the maximum rated current of 120 mA and the tracking coil was supplied with the maximum rated current of 150 mA. Then both samples were tested to determine whether they were able to reproduce data from an optical disc. The tests were carried out for ten second periods after each successive one minute of current application to the second sample. The first sample had no current supplied thereto.

As a result of the tests, the first sample took about 123 minutes to reproduce the data satisfactorily. On the other hand, the second sample took only 21 minutes before it could reproduce the data. Thus, the down time resulting from of the moisture condensating condition was shortened by about 1/6 when the maximum rated currents were applied to the focus coil and the tracking coil, as compared to the situation where no positive heating was conducted.

As described above, the present invention can provide an extremely preferable condensation moisture removing device for a disc information reproducing apparatus which can remove condensation moisture rapidly without the need for any additional element, such as a heater.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A disc information reproducing apparatus for reproducing information stored on an optical recording medium, the apparatus being subjected to expose to environments of varying temperature which produce condensation moisture in the apparatus, comprising:

optical means for projecting the beam onto the optical recording medium for reflecting and modulating the beam in accrodance with the information stored on the optical recording medium;

operating current means for generating a variable operating current in response to the reflected beam for controlling the optical means;

booster current source means for selectively supplying a boosted current larger than the operating current to the optical means for generating heat in the optical means for removing condensation moisture from the apparatus.

2. The apparatus of claim 1 wherein the optical means includes a lens, and coil mjeans for controlling the positioning of the lens with respect to the optical recording medium.

3. The apparatus of claim 2 wherein the optical means includes means for focusing the beam on the optical recording medium.

4. The apparatus of claim 2 wherein the coil means includes tracking means for controlling precise positioning of the beam on the optical recording medium.

5. The apparatus of claim 1 wherein the optical means includes a lens, and coil means for controlling the positioning of the lens with respect to the optical recording medium, the boosted current having a magnitude about equal to the maximum rated current of the coil means.

6. The apparatus of claim 1 wherein the boosted current source means includes condensation moisture sensor means for detecting the presence of a predetermined level of condensation moisture in the apparatus.

7. The apparatus of claim 6 wherein the boosted current source means includes switch means responsive to the condensation moisture sensor means for selectively supplying the boosted current.

8. The apparatus of claim 7 wherein the operating current means includes photodetector means positioned for receiving the reflected beam for converting the modulated beam into the operating current.

9. A method for removing condenston moisture from a disc information reproducing apparatus comprisimg the steps of:

generating an operating current corresponding to a beam of radiation reflected and modulated by an optical recording medium;

selectively suplying a boosted current, larger than the operating current, for generating heat in the apparatus for removing condensation moisture from the apparatus.

10. The method fo claim 9 wherein the step of selectively supplying the boosted current also includes the step of automatically detecting the presence of a predetermined level of condensation moisture in the apparatus.

* * * * *